US012307871B2

(12) United States Patent
Rizzardini et al.

(10) Patent No.: US 12,307,871 B2
(45) Date of Patent: May 20, 2025

(54) IN-SENSOR FALL DETECTION

(71) Applicant: STMicroelectronics International N.V., Geneva (CH)

(72) Inventors: Federico Rizzardini, Settimo Milanese (IT); Lorenzo Bracco, Chivasso (IT)

(73) Assignee: STMicroelectronics International N.V., Geneva (CH)

( * ) Notice: Subject to any disclaimer, the term of this patent is extended or adjusted under 35 U.S.C. 154(b) by 246 days.

(21) Appl. No.: 18/191,782

(22) Filed: Mar. 28, 2023

(65) Prior Publication Data

US 2024/0331522 A1 Oct. 3, 2024

(51) Int. Cl.
*G08B 21/04* (2006.01)
*G08B 29/18* (2006.01)

(52) U.S. Cl.
CPC ....... *G08B 21/0446* (2013.01); *G08B 21/043* (2013.01); *G08B 29/188* (2013.01)

(58) Field of Classification Search
CPC . G08B 21/0446; G08B 21/043; G08B 29/188
See application file for complete search history.

(56) References Cited

U.S. PATENT DOCUMENTS

2012/0092169 A1 4/2012 Kaiser et al.
2012/0259577 A1 10/2012 Ganyi
2013/0054180 A1 2/2013 Barfield
2013/0138395 A1 5/2013 Baggen et al.
2014/0031123 A1 1/2014 Sarrafzadeh et al.
2015/0025817 A1* 1/2015 Ten Kate ........... G08B 21/0446 702/50
2015/0100141 A1 4/2015 Hughes
2017/0200359 A1* 7/2017 Gregg .................. G08B 25/001
2017/0284805 A1* 10/2017 Zihajehzadeh ........ G06V 40/23
2018/0134384 A1* 5/2018 Ichihara ................. B64D 37/02
2020/0196914 A1* 6/2020 Sacha ................ G08B 21/0446
2020/0236479 A1 7/2020 Burwinkel et al.
2021/0112345 A1 4/2021 Wood et al.
(Continued)

FOREIGN PATENT DOCUMENTS

KR 20200137698 A 12/2020
KR 20230030386 A * 3/2023
WO WO-2010037564 A1 * 4/2010 ........... A61B 5/1117

OTHER PUBLICATIONS

Wang et al., "Low-Power Fall Detector Using Triaxial Accelerometry and Barometric Pressure Sensing," IEEE lransactions on Industrial Informatics, vol. 12, No. 6, 2016, pp. 2302-2311.
(Continued)

*Primary Examiner* — Ryan W Sherwin
(74) *Attorney, Agent, or Firm* — Seed IP Law Group LLP

(57) ABSTRACT

The present disclosure is directed to a device and method for human fall detection solution. Fall detection is performed by a low power inertial measurement unit (IMU) that is communicatively coupled between a pressure sensor and an application processor. The IMU includes one or more motions sensors, such as an accelerometer and gyroscope. The application processor is the main processor of the containing device. The IMU receives pressure sensor data from the pressure sensor, and executes the fall detection using both the pressure sensor data and accelerometer data.

20 Claims, 2 Drawing Sheets

(56) References Cited

U.S. PATENT DOCUMENTS

| | | | | |
|---|---|---|---|---|
| 2021/0150872 | A1 | 5/2021 | Ten Kate et al. | |
| 2022/0330903 | A1* | 10/2022 | McGovern ........... | A61B 5/7282 |
| 2024/0346906 | A1* | 10/2024 | Gorsuch .............. | G01C 21/206 |

OTHER PUBLICATIONS

Matteo et al., "Simultaneous Real-Time Human Fall Detection and Reidentification Based on Multisensors Data," Human Fall Detection and Reidentification, 2022. (6 pages).

Serpen et al., "Real-time Detection of Human Falls in Progress: Machine Learning Approach," Procedia Computer Science 140, 238-247, 2018.

Khan et al., "An unsupervised acoustic fall detection system using source separation for sound interference suppression," Signal Processing 110, 199-210, 2015.

* cited by examiner

IN-SENSOR FALL DETECTION

BACKGROUND

Technical Field

The present disclosure is directed to fall detection for various devices.

Description of the Related Art

Human fall detection, sometimes referred to as man-down detection, involves identifying when a person falls to the ground. Fall detection has become increasingly popular, and is often included in wearable devices. Upon detecting a fall of a user, the device, for example, alerts emergency services to aid the user.

Current fall detection solutions typically utilize motion sensors and machine learning techniques. Unfortunately, such machine learning techniques are computationally intensive and have high power consumption. Further, current solutions are implemented on the main application processor or microcontroller of the device that also has high power consumption. As such, current fall detection solutions are not ideal for portable wearable devices, such as headphones and smart watches, belts, and necklaces.

BRIEF SUMMARY

The present disclosure is directed to a reliable human fall detection solution with a low false positive rate. The fall detection is designed to execute in sensor hardware itself, where current consumption can be decreased to the minimum. The fall detection solution may continuously execute within portable wearable devices, such as headphones and smart watches, belts, and necklaces.

Fall detection is performed by a low power inertial measurement unit (IMU) that is communicatively coupled between a pressure sensor and an application processor. The IMU includes one or more motions sensors, such as an accelerometer and a gyroscope; and the application processor is the main processor of the containing device. The IMU receives pressure sensor data from the pressure sensor, and executes the fall detection using both the pressure sensor data and accelerometer data.

In contrast to prior fall detection solutions, the IMU does not use machine learning when executing the fall detection. Instead, the IMU uses a finite state machine configured to perform shock detection, altitude change detection, shock end detection, and steadiness detection.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of operation of electronic components and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, current fall detection solutions utilize motion sensors, and machine learning techniques that are computationally intensive with high power consumption. Further, current solutions are implemented on the main application processor or microcontroller of the device, which also has high power consumption.

The present disclosure is directed to a reliable human fall detection solution with a low false positive rate. The fall detection is performed in sensor hardware itself, where current consumption is minimal. As such, the fall detection solution may be continuously executed within portable wearable devices, such as headphones and smart watches, belts, and necklaces.

Figure 1:
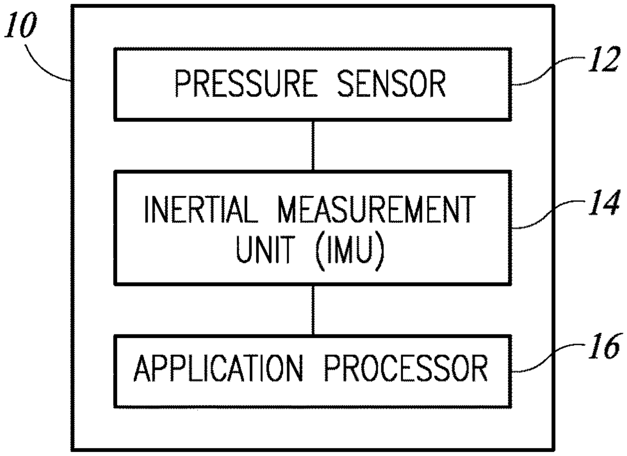
FIG. 1 is a block diagram of a device according to an embodiment disclosed herein.

FIG. 1 is a block diagram of a device 10 according to an embodiment disclosed herein. The device 10 may be any type of electronic device including fall detection. In one embodiment, the device 10 is a wearable device, such as headphones, a hearing device, a helmet, a smart watch, a smart band, and a smart necklace. The device 10 includes a pressure sensor 12, an inertial measurement unit (IMU) 14, and an application processor 16.

The pressure sensor 12 is an electronic sensor configured to measure pressure in a surrounding environment of the device 10, and generate pressure signals or data indicating the measured pressure. In one embodiment, the pressure sensor 12 is a microelectromechanical system (MEMS) sensor. The pressure sensor 12 is communicatively coupled to the IMU 14, and outputs pressure signals to the IMU 14.

The IMU 14 is an electronic inertial sensor that includes one or more types of motion sensors including, but not limited to, an accelerometer and a gyroscope. The accelerometer is configured to measure acceleration of the device 10 along one or more axes (e.g., a single axis, two axes, three axes, etc.), and generate acceleration signals or data indicating the measured acceleration. The gyroscope is configured to measure angular velocity of the device 10 along one or more axes (e.g., a single axis, two axes, three axes, etc.), and generate velocity signals or data indicating the measured velocity. The IMU 14 also includes its own onboard memory and processor. The processor is configured to process signals generated by sensors, and execute simple programs, such as finite state machines and signal filtering logics. In one embodiment, the IMU 14 is a microelectromechanical system (MEMS) sensor.

The IMU 14 is communicatively coupled between the pressure sensor 12 and the application processor 16. The IMU 14 receives pressure signals from the pressure sensor 12, and performs fall detection using the pressure signals along with acceleration signals. The IMU 14 outputs fall detection results to the application processor 16. Fall detection will be discussed in further detail below.

The pressure sensor 12 and the IMU 14 are power-efficient, low-powered devices that remain on after the device 10 enters a sleep state. For example, each of the pressure sensor 12 and the IMU 14 consumes microamps of current for processing. In the sleep state, the application processor 16 and other electronic components (e.g., speakers, other sensors, processors, a Bluetooth module, a Wi-Fi module, etc.) of the device 10 are set to a low-powered or off state.

The application processor 16 is a general-purpose processing unit. The application processor 16 may be any type of processor, controller, or signal processor configured to process data. In one embodiment, the application processor 16 is the device's 10 own general-purpose processor that, along with processing data for fall detection discussed below, is utilized to process data for the operating system, user applications, and other types of software of the device 10.

The application processor 16 is communicatively coupled to the IMU 14. The application processor 16 receives fall detection results from the IMU 14. As will be discussed in further detail below, the application processor 16 performs various actions based on the fall detection results.

In contrast to the pressure sensor 12 and the IMU 14, the application processor 16 is a high-powered processing unit. For example, the application processor 16 consumes milliamps of current during processing rather than microamps of current like the IMU 14. In order to conserve power, the application processor 16 is set to a low-powered or off state when the device 10 enters the sleep state.

In one embodiment, the application processor 16 is not directly communicatively coupled to the pressure sensor 12. Stated differently, the application processor 16 does not directly receive or process pressure signals generated by the pressure sensor 12. Instead, as discussed above, pressure signals are received and processed by the IMU 14. With this configuration, the application processor 16 may be in the sleep state while fall detection is performed. Thus, fall detection may continuously be executed even if the device 10 is in the sleep state. As a result, power of the device 10 is not unnecessarily drained by the application processor 16 and other high-powered components of the device 10.

Figure 2:
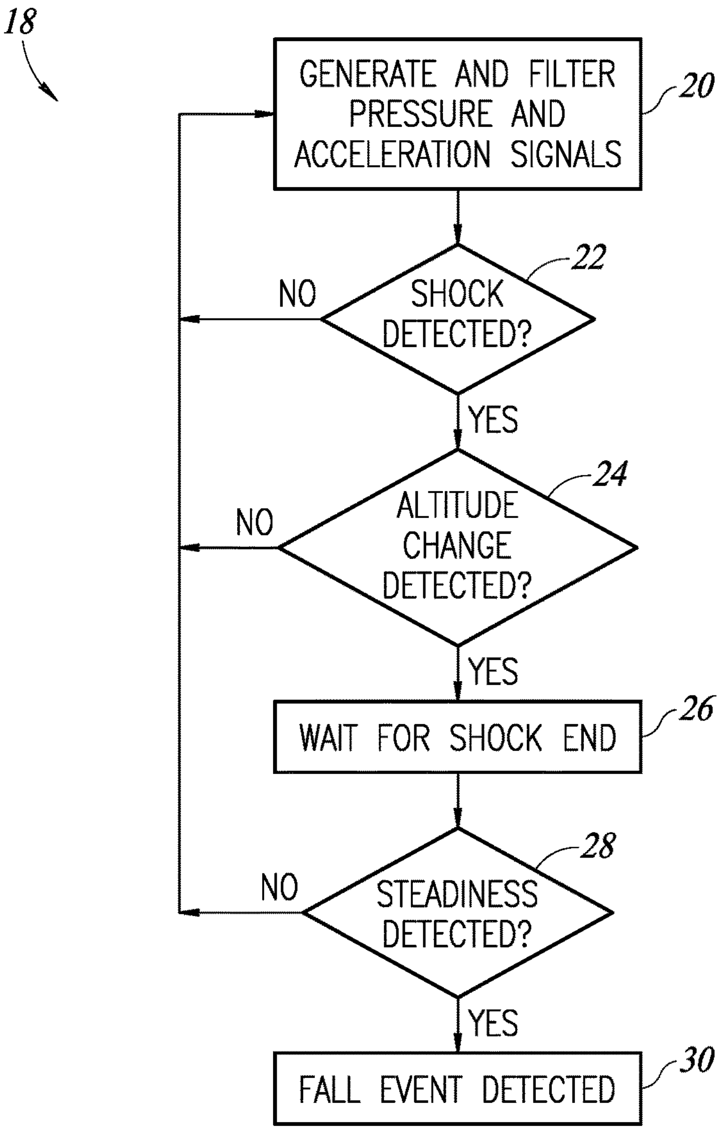
FIG. 2 is a flow diagram of a fall detection method according to an embodiment disclosed herein.

FIG. 2 is a flow diagram of a fall detection method 18 according to an embodiment disclosed herein. The fall detection method 18 is performed by the device 10.

In block 20, pressure and acceleration signals are generated by the pressure sensor 12 and the accelerometer of the IMU 14, respectively, and filtered by the IMU 14. As discussed above, the pressure signals indicate the current measured pressure in a surrounding environment, and the acceleration signals indicate the current measured accelerations of the device 10. In this embodiment, acceleration is measure along at least three different axes, more specifically, an x-axis, a y-axis orthogonal to the x-axis, and a z-axis orthogonal to the x-axis and the y-axis. However, acceleration may be measured along any number of axes.

The pressure signal is generated by the pressure sensor 12 and received by the IMU 14. The IMU 14 filters the pressure signal, along with the acceleration signals generated by the IMU 14 itself. The pressure and acceleration signals are filtered to remove the direct current (DC) components of the signals such that subsequent processing is focused on variations of the signals. In one embodiment, pressure signals are filtered with a high pass filter, such as a first order infinite impulse response (IIR) filter, with a cutoff of 0.5 hertz. In another embodiment, pressure signals are filtered with a band pass filter to both remove DC components and smooth the pressure signals. In one embodiment, acceleration signals are filtered with a high pass filter with a cutoff of 1 hertz. In another embodiment, acceleration signals are filtered with a band pass filter to both remove DC components and smooth the acceleration signals. As discussed below, unfiltered acceleration signals are also used. The method 18 then moves to block 22.

Although block 20 is shown first in the method 18, the filtering of the pressure and acceleration signals may also be performed throughout the method 18. For example, pressure signals may be filtered between block 22 and block 24, and acceleration signals may be filtered between block 26 and 28.

In block 22, shock detection is performed by the IMU 14. Shock detection detects a shock or sudden disturbance of the device 10 or of a user wearing the device 10, caused by, for example, the user suddenly hitting the ground. In shock detection, the IMU 14 determines a norm of the acceleration signals along the x-axis, y-axis, and z-axis; determines whether or not the norm is greater than a shock threshold value (e.g., 8 g); and detects a shock state indicating a shock has occurred in response to the norm being greater than the shock threshold value. The shock state is not detected in response to the norm being equal to or less than the shock threshold value. It is noted that, in this embodiment, the norm is not based on the filtered acceleration signals from block 20, but is the norm of the unfiltered acceleration signals generated by the accelerometer of the IMU 14. In another embodiment, the IMU 14 determines the norm of the filtered acceleration signals from block 20.

In a case where a shock state is not detected, the method 18 returns to block 20 where pressure and acceleration signals are continued to be generated by the pressure sensor 12 and the accelerometer of the IMU 14, respectively, and filtered by the IMU 14. In a case where the shock state is detected, the method 18 moves to block 24.

In block 24, altitude change detection is performed by the IMU 14. Altitude change detection detects altitude variation, more specifically altitude decrease, of the device 10 or of a user wearing the device 10 due to, for example, the user changing from a standing position to falling to the ground. In altitude change detection, the IMU 14 determines whether or not the filtered pressure signal is greater than an altitude change threshold value (e.g., 0.04 bar) within an altitude change threshold amount of time (e.g., 1 second) from the shock detection in block 22; and detects an altitude change state indicating an altitude change has occurred in response to the filtered pressure signal being greater than the altitude change threshold value within the altitude change threshold amount of time from the shock detection. The altitude change state is not detected in response to the filtered pressure signal being equal to or less than the altitude change threshold value within the altitude change threshold amount of time from the shock detection.

In a case where an altitude change state is not detected, the method 18 returns to block 20 where pressure and acceleration signals are continued to be generated by the pressure sensor 12 and the accelerometer of the IMU 14, respectively, and filtered by the IMU 14. In a case where the altitude change state is detected, the method 18 moves to block 26.

In block 26, shock end detection is performed by the IMU 14. Shock end detection detects the end of the shock state detected in block 22. For example, the shock end detection determines when the user is no longer falling to the ground. In shock end detection, the IMU 14 waits or pauses the method 18 for a shock end threshold amount of time (e.g., between 0.5 and 1 seconds) starting from the detection of the shock state detected in block 22. Upon expiration or elapse of the shock end threshold amount of time, the IMU 14 detects an end to the shock state detected in block 22. The method 18 then moves to block 28.

In block 28, steadiness detection is performed by the IMU 14. Steadiness detection detects that the device 10 or user is in a steady state or no longer moving after the shock state. In steadiness detection, the IMU 14 determines whether or not all of the filtered acceleration signals along the x-axis, y-axis, and z-axis are less than a steadiness threshold value (e.g., 0.1 g) for a steadiness threshold amount of time (e.g., from 1 second to 1 minute); and detects a steadiness state indicating the device 10 is in a steady state in response to all of the filtered acceleration signals along the x-axis, y-axis, and z-axis being less than the steadiness threshold value for the steadiness threshold amount of time. The steadiness state is not detected in response to one of the filtered acceleration signals along the x-axis, y-axis, and z-axis being equal to or greater than the steadiness threshold value within the steadiness threshold amount of time. It is noted that, in contrast to block 22, steadiness detection is based on the filtered acceleration signals from block 20. In one embodiment, the steadiness threshold value is less than the shock threshold value.

In a case where a steadiness state is not detected, the method 18 returns to block 20 where pressure and acceleration signals are continued to be generated by the pressure sensor 12 and the accelerometer of the IMU 14, respectively, and filtered by the IMU 14. In a case where the steadiness state is detected, the method 18 moves to block 30.

In block 30, the IMU 14 detects a fall or man-down event, which indicates the user has fallen to, for example, the ground. Various actions may be taken in response to the fall event being detected by the IMU 14.

In one embodiment, the IMU 14 outputs an indication of the fall event to the application processor 16; and, in response, the application processor 16 prompts the user to confirm that the fall event has actually occurred. In this embodiment, the steadiness threshold amount of time in block 28 is set to be seconds (e.g., between 1 and 10 seconds).

In one embodiment, the IMU 14 outputs an indication of the fall event to the application processor 16; and, in response, the application processor 16 automatically calls for emergency services. In this embodiment, the steadiness threshold amount of time in block 28 is set to be minutes (e.g., between 1 and 3 minutes).

In one embodiment, the application processor 16 is set to a sleep state during performance of the blocks 20, 22, 24, 26, 28, and 30 in order to conserve power. The IMU 14 outputs an interrupt to wake the application processor 16 in response to detecting the fall event. The application processor 16 may take any action including the actions described above.

It is noted that the method 18 may be performed by the IMU 14 without the use of machine learning techniques. Rather, the method 18, including the shock detection, altitude change detection, shock end detection, and steadiness detection, may be performed by the IMU 14 using, for example, a finite state machine or signal filtering logics. As such, the IMU 14 does not perform high powered, intensive processing to perform fall detection.

Figure 3:
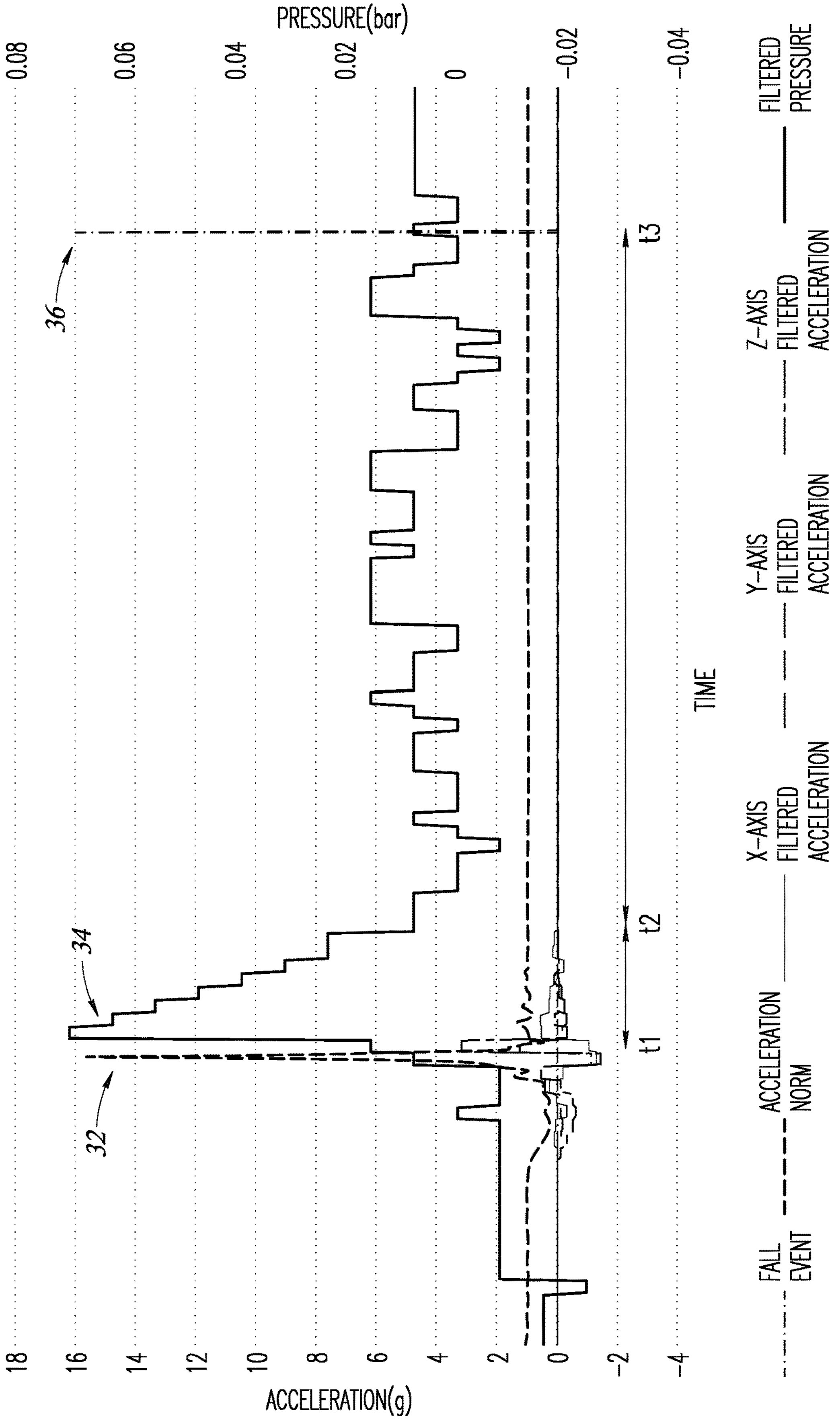
FIG. 3 shows detection signals during a fall detection method according to an embodiment disclosed herein.

FIG. 3 shows signals during a fall detection method according to an embodiment disclosed herein. The horizontal axis is a time axis that indicates time or a number of samples. The horizontal axis may have any type of time unit, such as seconds, number of samples, etc. The left vertical axis is an acceleration axis that indicates acceleration of the device 10 measured by the accelerometer of the IMU 14, represented in g. The right vertical axis is a pressure axis that indicates pressure of the device 10 measured by the pressure sensor 12 represented in bar.

An x-axis filtered acceleration signal, a y-axis filtered acceleration signal, a z-axis filtered acceleration signal, a filtered pressure signal, an acceleration norm signal, and a fall event signal, are shown in FIG. 3.

The x-axis, y-axis, and z-axis filtered acceleration signals indicate the acceleration signals along the x-axis, y-axis, and z-axis generated by the accelerometer of the IMU 14 and filtered in block 20. As discussed above, the acceleration signals are filtered using a high pass filter.

The filtered pressure signal is the pressure signal generated by the pressure sensor 12 and filtered in block 20. As discussed above, the pressure signal is filtered using a high pass filter.

The acceleration norm signal is the norm of the acceleration signals along the x-axis, y-axis, and z-axis generated by the accelerometer of the IMU 14, as determined in block 22.

The fall event signal indicates occurrence of a fall event. The fall event signal has a low state (e.g., zero in FIG. 3) when no fall event is detected in block 30, and a high state (e.g., non-zero in FIG. 3) when a fall event is detected in block 30.

At point 32 and time t1 in FIG. 3, a shock state is detected in block 22. As discussed above, the IMU 14 detects a shock state in response to the acceleration norm being greater than the shock threshold value. As shown in FIG. 3, the acceleration norm signal reaches a peak at point 32, and exceeds a shock threshold value of, for example, 14 g.

At point 34 between times t1 and t2 in FIG. 3, an altitude change state is detected in block 24. As discussed above, the IMU 14 detects an altitude change state in response to the filtered pressure signal being greater than the altitude change threshold value within the altitude change threshold amount of time from the shock detection. As shown in FIG. 3, the filtered pressure signal reaches a peak at point 34, and exceeds an altitude change threshold value of, for example, 0.06 bar, within an altitude change threshold amount of time (e.g., 1 second) from the shock state at point 32.

Between times t1 and t2 in FIG. 3, shock end detection is performed by the IMU 14 in block 26. As discussed above, the IMU 14 waits or pauses the method 18 for a shock end threshold amount of time (e.g., between 0.5 and 1 seconds) starting from the shock state at point 32 at time t1. In FIG. 3, the shock end threshold amount of time elapses and an end to the shock state is detected at time t2.

Between time t2 and t3 in FIG. 3, steadiness detection is performed by the IMU 14 in block 28. As discussed above, the IMU 14 detects a steadiness state in response to all of the x-axis, y-axis, and z-axis filtered acceleration signals being less than a steadiness threshold value (e.g., 0.1 g) for a steadiness threshold amount of time (e.g., from 1 second to 1 minute). In FIG. 3, the x-axis, y-axis, and z-axis filtered acceleration signals are less than the steadiness threshold value for a steadiness threshold amount of time at time t3. As a result, a steadiness state is detected at time t3. At point 36 and time t3 in FIG. 3, the IMU 14 detects a fall or man-down event, which indicates the user has fallen to, for example, the ground in response to the steadiness state being detected.

The various embodiments disclosed herein provide a device and method for human fall detection. Fall detection is performed by a low power IMU that is communicatively coupled between a pressure sensor and an application processor. The IMU receives pressure sensor data from the pressure sensor, and executes the fall detection using both the pressure sensor data and motion data generated by the IMU itself. The IMU informs the application processor of a detected fall event.

A device may be summarized as including: a pressure sensor configured to measure pressure in a surrounding environment of the device, and generate a pressure signal indicating the measured pressure; an inertial measurement unit configured to: receive the pressure signal from the pressure sensor; measure accelerations of the device along a plurality of axes; generate acceleration signals indicating the measured acceleration; and perform fall detection based on the pressure signal and the acceleration signals to detect a fall event; and an application processor configured to be notified of the fall event by the inertial measurement unit, the inertial measurement unit communicatively coupled between the pressure sensor and the application processor.

The application processor may be configured to be in a sleep state concurrently with the fall detection being performed.

The fall detection may include shock detection, altitude change detection, shock end detection, and steadiness detection.

For the shock detection, the inertial measurement unit may determine a norm of the acceleration signals, and may detect a shock state in response to the norm being greater than a shock in threshold value.

For the altitude change detection, the inertial measurement unit may filter the pressure signal with a first filter, and may detect an altitude change state in response to the filtered pressure signal being greater than an altitude change threshold value within a first threshold amount of time from the shock state being detected.

For the shock detection, the inertial measurement unit may detect an end to the shock state in response to elapsing of a second threshold amount of time from the shock state being detected. For the steadiness detection, the inertial measurement unit may filter the acceleration signals with a second filter, and may detect a steadiness state in response to the filtered acceleration signals being less than a steadiness threshold value for a threshold amount of time.

The inertial measurement unit may be configured to detect the fall event in response to the steadiness state being detected.

Processing of the application processor may consume a greater amount of power than processing of the inertial measurement unit.

A method may be summarized as including: measuring, by a pressure sensor, pressure in a surrounding environment; generating, by the pressure sensor, a pressure signal indicating the measured pressure; receiving, by an inertial measurement unit, the pressure signal from the pressure sensor; measuring, by the inertial measurement unit, accelerations along a plurality of axes; generating, by the inertial measurement unit, acceleration signals indicating the measured acceleration; and performing, by the inertial measurement unit, fall detection based on the pressure signal and the acceleration signals to detect a fall event; and notifying, by the inertial measurement unit, an application processor of the fall event.

Performing the fall detection may include: determining, by the inertial measurement unit, a norm of the acceleration signals; and detecting, by the inertial measurement unit, a shock state in response to the norm being greater than a shock threshold value.

Performing the fall detection may include: filtering, by the inertial measurement unit, the pressure signal with a first filter; and detecting, by the inertial measurement unit, an altitude change state in response to the filtered pressure signal being greater than an altitude change threshold value within a first threshold amount of time from the shock state being detected.

Performing the fall detection may include: detecting, by the inertial measurement unit, an end to the shock state in response to elapsing of a second threshold amount of time from the shock state being detected.

Performing the fall detection may include: filtering, by the inertial measurement unit, the acceleration signals with a second filter; detecting, by the inertial measurement unit, a steadiness state in response to the filtered acceleration signals being less than a steadiness threshold value for a threshold amount of time; and detecting, by the inertial measurement unit, the fall event in response to the steadiness state being detected.

A device may be summarized as including: a pressure sensor configured to generate pressure data indicating pressure in a surrounding environment of the device; and an inertial measurement unit configured to: receive the pressure data from the pressure sensor; generate acceleration data indicating acceleration of the device along a plurality of axes; and detect a fall event based on the pressure data and the acceleration data; and output the fall event.

The device may further include an application processor configured to receive the fall event from the inertial measurement unit, the inertial measurement unit communicatively coupled between the pressure sensor and the application processor.

Processing of the application processor may consume a greater amount of power than processing of the inertial measurement unit.

The inertial measurement unit may detect the fall event with a finite state machine.

The inertial measurement unit may be configured to perform shock detection, altitude change detection, shock end detection, and steadiness detection.

The fall event may be detected based on results of the shock detection, the altitude change detection, the shock end detection, and the steadiness detection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:

a pressure sensor configured to measure pressure in a surrounding environment of the device, and generate a pressure signal indicating the measured pressure;

an inertial measurement unit configured to:

receive the pressure signal from the pressure sensor;
measure accelerations of the device along a plurality of axes;
generate acceleration signals indicating the measured acceleration; and
perform fall detection based on the pressure signal and the acceleration signals to detect a fall event; and
an application processor configured to be notified of the fall event by the inertial measurement unit, the inertial measurement unit communicatively coupled between the pressure sensor and the application processor.

2. The device of claim 1 wherein the application processor is configured to be in a sleep state concurrently with the fall detection being performed.

3. The device of claim 1 wherein the fall detection includes shock detection, altitude change detection, shock end detection, and steadiness detection.

4. The device of claim 3 wherein, for the shock detection, the inertial measurement unit determines a norm of the acceleration signals, and detects a shock state in response to the norm being greater than a shock threshold value.

5. The device of claim 4 wherein, for the altitude change detection, the inertial measurement unit filters the pressure signal with a first filter, and detects an altitude change state in response to the filtered pressure signal being greater than an altitude change threshold value within a first threshold amount of time from the shock state being detected.

6. The device of claim 5 wherein, for the shock detection, the inertial measurement unit detects an end to the shock state in response to elapsing of a second threshold amount of time from the shock state being detected.

7. The device of claim 6 wherein, for the steadiness detection, the inertial measurement unit filters the acceleration signals with a second filter, and detects a steadiness state in response to the filtered acceleration signals being less than a steadiness threshold value for a threshold amount of time.

8. The device of claim 7 wherein the inertial measurement unit is configured to detect the fall event in response to the steadiness state being detected.

9. The device of claim 1 wherein processing of the application processor consumes a greater amount of power than processing of the inertial measurement unit.

10. A method comprising:
measuring, by a pressure sensor, pressure in a surrounding environment;
generating, by the pressure sensor, a pressure signal indicating the measured pressure;
receiving, by an inertial measurement unit, the pressure signal from the pressure sensor;
measuring, by the inertial measurement unit, accelerations along a plurality of axes;
generating, by the inertial measurement unit, acceleration signals indicating the measured acceleration; and
performing, by the inertial measurement unit, fall detection based on the pressure signal and the acceleration signals to detect a fall event; and
notifying, by the inertial measurement unit, an application processor of the fall event.

11. The method of claim 10 wherein performing the fall detection includes:

determining, by the inertial measurement unit, a norm of the acceleration signals; and
detecting, by the inertial measurement unit, a shock state in response to the norm being greater than a shock threshold value.

12. The method of claim 11 wherein performing the fall detection includes:
filtering, by the inertial measurement unit, the pressure signal with a first filter; and
detecting, by the inertial measurement unit, an altitude change state in response to the filtered pressure signal being greater than an altitude change threshold value within a first threshold amount of time from the shock state being detected.

13. The method of claim 12 wherein performing the fall detection includes:
detecting, by the inertial measurement unit, an end to the shock state in response to elapsing of a second threshold amount of time from the shock state being detected.

14. The method of claim 12 wherein performing the fall detection includes:
filtering, by the inertial measurement unit, the acceleration signals with a second filter;
detecting, by the inertial measurement unit, a steadiness state in response to the filtered acceleration signals being less than a steadiness threshold value for a threshold amount of time; and
detecting, by the inertial measurement unit, the fall event in response to the steadiness state being detected.

15. A device, comprising:
a pressure sensor configured to generate pressure data indicating pressure in a surrounding environment of the device; and
an inertial measurement unit configured to:
receive the pressure data from the pressure sensor;
generate acceleration data indicating acceleration of the device along a plurality of axes; and
detect a fall event based on the pressure data and the acceleration data; and
output the fall event.

16. The device of claim 15, further comprising:
an application processor configured to receive the fall event from the inertial measurement unit, the inertial measurement unit communicatively coupled between the pressure sensor and the application processor.

17. The device of claim 16 wherein processing of the application processor consumes a greater amount of power than processing of the inertial measurement unit.

18. The device of claim 15 wherein the inertial measurement unit detects the fall event with a finite state machine.

19. The device of claim 15 wherein the inertial measurement unit is configured to perform shock detection, altitude change detection, shock end detection, and steadiness detection.

20. The device of claim 19 wherein the fall event is detected based on results of the shock detection, the altitude change detection, the shock end detection, and the steadiness detection.

* * * * *